United States Patent
Auerbach et al.

(10) Patent No.: US 8,595,214 B1
(45) Date of Patent: Nov. 26, 2013

(54) SYSTEMS AND METHODS FOR ARTICLE LOCATION AND RETRIEVAL

(75) Inventors: David Benjamin Auerbach, Brooklyn, NY (US); Stephen R. Lawrence, Mountain View, CA (US)

(73) Assignee: Google Inc., Mountain View, CA (US)

( * ) Notice: Subject to any disclaimer, the term of this patent is extended or adjusted under 35 U.S.C. 154(b) by 1536 days.

(21) Appl. No.: 10/814,055

(22) Filed: Mar. 31, 2004

(51) Int. Cl.
*G06F 17/30* (2006.01)

(52) U.S. Cl.
USPC .......................................... 707/715; 707/717

(58) Field of Classification Search
USPC ........ 707/102, 3, 715, 717; 705/412; 395/828
See application file for complete search history.

(56) References Cited

U.S. PATENT DOCUMENTS

| | | | |
|---|---|---|---|
| 4,825,388 A | | 4/1989 | Dailey et al. |
| 5,388,257 A | * | 2/1995 | Bauer ................................. 707/1 |
| 5,701,469 A | | 12/1997 | Brandli et al. |
| 5,701,474 A | * | 12/1997 | Harper ........................... 707/205 |
| 5,758,331 A | * | 5/1998 | Johnson ......................... 705/412 |
| 5,813,007 A | | 9/1998 | Nielsen |
| 5,859,639 A | | 1/1999 | Ebrahim |
| 5,867,729 A | * | 2/1999 | Swonk ............................... 710/8 |
| 5,886,694 A | | 3/1999 | Breinberg et al. |
| 6,006,222 A | | 12/1999 | Culliss |
| 6,009,459 A | | 12/1999 | Belfiore et al. |
| 6,014,665 A | | 1/2000 | Culliss |
| 6,078,916 A | | 6/2000 | Culliss |
| 6,169,979 B1 | * | 1/2001 | Johnson ......................... 705/412 |
| 6,182,068 B1 | | 1/2001 | Culliss |
| 6,272,489 B1 | | 8/2001 | Rauch et al. |
| 6,310,984 B2 | | 10/2001 | Sansom-Wai et al. |
| 6,380,983 B1 | | 4/2002 | Miyazaki et al. |
| 6,384,840 B1 | | 5/2002 | Frank et al. |
| 6,393,456 B1 | | 5/2002 | Ambler et al. |
| 6,401,097 B1 | | 6/2002 | McCotter et al. |
| 6,456,307 B1 | | 9/2002 | Bates et al. |
| 6,466,238 B1 | | 10/2002 | Berry et al. |
| 6,484,156 B1 | | 11/2002 | Gupta et al. |
| 6,484,162 B1 | | 11/2002 | Edlund et al. |
| 6,581,056 B1 | | 6/2003 | Rao |
| 6,654,036 B1 | | 11/2003 | Jones |
| 6,701,009 B1 | | 3/2004 | Makoto et al. |
| 6,711,565 B1 | | 3/2004 | Subramaniam et al. |
| 6,718,334 B1 | * | 4/2004 | Han ............................. 707/102 |
| 6,725,244 B1 | * | 4/2004 | Bonwick ....................... 707/205 |

(Continued)

FOREIGN PATENT DOCUMENTS

| | | |
|---|---|---|
| WO | WO 01/55909 | 8/2001 |

OTHER PUBLICATIONS

U.S. Appl. No. 10/749,440, filed Dec. 31, 2003, Badros et al.

(Continued)

*Primary Examiner* — John E Breene
*Assistant Examiner* — Dennis Myint
(74) *Attorney, Agent, or Firm* — Fenwick & West LLP (57) ABSTRACT

Systems and methods for article location and retrieval are described. In one described method, the normal processing of an operating system call associated with a dialog control is interrupted, and a search dialog control is displayed. The search dialog control is associated with an index comprising a plurality of events. Each of the plurality of events may be associated with at least one of a plurality of client applications and at least some of the plurality of events can be captured in real time. Each event may be associated with one or more articles.

20 Claims, 3 Drawing Sheets

(56) References Cited

U.S. PATENT DOCUMENTS

| | | | |
|---|---|---|---|
| 6,735,774 B1* | 5/2004 | Krishnaswamy | 719/328 |
| 6,745,178 B1 | 6/2004 | Emens et al. | |
| 6,801,906 B1 | 10/2004 | Bates et al. | |
| 6,816,847 B1 | 11/2004 | Toyama | |
| 6,971,068 B2 | 11/2005 | Bates | |
| 6,981,040 B1 | 12/2005 | Konig et al. | |
| 6,995,805 B1 | 2/2006 | Park | |
| 7,031,961 B2 | 4/2006 | Pitkow et al. | |
| 7,047,502 B2 | 5/2006 | Petropoulos et al. | |
| 7,082,428 B1 | 7/2006 | Denny et al. | |
| 7,146,573 B2 | 12/2006 | Brown et al. | |
| 7,149,974 B2 | 12/2006 | Girgensohn et al. | |
| 7,162,473 B2 | 1/2007 | Dumais et al. | |
| 7,194,460 B2 | 3/2007 | Komamura | |
| 7,225,187 B2 | 5/2007 | Dumais et al. | |
| 7,409,646 B2 | 8/2008 | VedBrat et al. | |
| 2002/0019763 A1 | 2/2002 | Linden et al. | |
| 2002/0038299 A1 | 3/2002 | Zernik et al. | |
| 2002/0055919 A1 | 5/2002 | Mikheev | |
| 2002/0065841 A1 | 5/2002 | Matsuda et al. | |
| 2002/0107847 A1 | 8/2002 | Johnson | |
| 2002/0147704 A1 | 10/2002 | Borchers | |
| 2003/0112278 A1 | 6/2003 | Driskell | |
| 2003/0135430 A1* | 7/2003 | Ibbotson | 705/27 |
| 2003/0135490 A1 | 7/2003 | Barrett et al. | |
| 2003/0144996 A1 | 7/2003 | Moore | |
| 2003/0167266 A1 | 9/2003 | Saldanha et al. | |
| 2003/0217108 A1* | 11/2003 | Karim | 709/206 |
| 2003/0218636 A1* | 11/2003 | McIntyre et al. | 345/809 |
| 2004/0003351 A1 | 1/2004 | Sommerer et al. | |
| 2004/0030741 A1 | 2/2004 | Wolton et al. | |
| 2004/0098394 A1* | 5/2004 | Merritt et al. | 707/100 |
| 2004/0143564 A1 | 7/2004 | Gross et al. | |
| 2004/0143569 A1 | 7/2004 | Gross et al. | |
| 2004/0215607 A1 | 10/2004 | Travis | |
| 2004/0267730 A1 | 12/2004 | Dumais et al. | |
| 2005/0028108 A1 | 2/2005 | Baudisch et al. | |
| 2005/0050454 A1 | 3/2005 | Jennery et al. | |
| 2005/0065958 A1 | 3/2005 | Dettinger et al. | |
| 2005/0076019 A1 | 4/2005 | Jackson et al. | |
| 2005/0086254 A1 | 4/2005 | Zou et al. | |
| 2005/0108394 A1 | 5/2005 | Braun et al. | |
| 2005/0108655 A1 | 5/2005 | Andrea et al. | |
| 2005/0131888 A1 | 6/2005 | Tafoya et al. | |
| 2005/0149496 A1 | 7/2005 | Mukherjee et al. | |
| 2005/0149498 A1 | 7/2005 | Lawrence et al. | |
| 2006/0036966 A1 | 2/2006 | Yevdayev | |

OTHER PUBLICATIONS 80-20 Software—Products—80-20 One Search, http://www.80-20.com/products/one-search/retriever.asp, printed Mar. 16, 2004.
"askSam™ Making Information Useful," askSam,—Organize your information with askSam, http://www.asksam.com/brochure.asp, printed Mar. 15, 2004.
Alexa® Web Search—Toolbar Quick Tour, http://pages.alexa.com/prod_serv/quicktour.html, pp. 1-5, printed Mar. 16, 2004.
Barrett, R. et al., "How to Personalize the Web;" IBM Research, http://www.almaden.ibm.com/cs/wbl/papers/chi97/wbipaper.html, pp. 1-13, printed Mar. 16, 2004.
Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.
Boyan, J., et al., "A Machine Learning Architecture for Optimizing Web Search Engines," School of Computer Science, Carnegie Mellon University, May 10, 1996, pp. 1-8.
Bradenbaugh, F., "Chapter 1 The Client-Side Search Engine," *JavaScript Cookbook*, 1st Ed., Oct. 1999, O'REILLY™ Online Catalog, http://www.oreilly.com/catalog/jscook/chapter/ch01.html, pp. 1-30, printed Dec. 29, 2003.
Brin, S., et al, "The Anatomy of a Large-Scale Hypertextual Web Search Engine," http://www7.scu.edu.au/programm/fullpapers/1921/com1921.htm, pp. 1-18, 1998.
Budzik, J., et al., User Interactions with Everyday Applications as Context for Just-in-time Information Access, Intelligent Information Laboratory, Northwestern University, pp. 1-8, no date.
DEVONthink, http://www.devon-techonologies.com/products/devonthink.php, printed Mar. 16, 2004.
dtSearch®—http://www.dtsearch.com/, printed Mar. 15, 2004.
Dumais, S., et al, "Stuff I've Seen: A System for Personal Information Retrieval and Re-Use," Microsoft Research, *SIGIR '03*, Jul. 28-Aug. 1, 2003, pp. 1-8.
Enfish, http://www.enfish.com, printed Mar. 16, 2004.
Fast Search & Transfer—Home—Enterprise Search, http://solutions.altavista.com/en/news/pr_020402_desktop.shtmu, printed Mar. 16, 2004.
Fertig, S., et al., "Lifestreams: An Alternative to the Desktop Metaphor," http://www.acm.org/sigchi/chi96/proceedings/videos/Fertig/etf.htm, pp. 1-3, printed Mar. 18, 2004.
Geisler, G., "Enriched Links: A Framework for Improving Web Navigation Using Pop-Up Views," pp. 1-14, 2000.
ISYS Search Software—ISYS: desktop, http://www.isysusa.com/products/desktop/index.html, printed Mar. 16, 2004.
Joachims, T., et al., "WebWatcher: A Tour Guide for the World Wide Web." 1998.
Markoff, J., "Google Moves Toward Clash with Microsoft," *The New York Times*, May 19, 2004, http://www.nytimes.com/2004/5/19/technology/19google.html?ex=1085964389&ej=1&e . . . , pp. 1-4, printed May 19, 2004.
Naraine, R., "Future of Search Will Make You Dizzy," Enterprise, May 20, 2004, http://www.internetnews.com/ent-news/article.php/3356831, pp. 1-4, printed May 21, 2004.
"Overview," Stuff I've Seen—Home Page, http://research.Microsoft.com/adapt/sis/index.htm, pp. 1-2, printed May 26, 2004.
Rhodes, B., "Margin Notes Building a Contextually Aware Associative Memory," *The Proceedings of the International Conference on Intelligent User Interfaces (IUI'00)*, Jan. 9-12, 2000.
Rhodes, B., et al., "Just-in-time information retrieval agents," *Systems Journal*, vol. 39, Nos. 3&4, 2000, pp. 685-704.
Rhodes, B., et al., "Remembrance Agent—A continuously running automated Information retrieval system," *The Proceedings of the First International Conference on the Practical Application of Intelligent Agents and Multi Agent Technology* (PAAM '96), pp. 487-495.
Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm . . . . pp. 1-5, printed Apr. 21, 2004.
"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.
"Selecting Task-Relevant Sources for Just-In-Time Retrieval." pp. 1-3, no date.
Sherman, C., "HotBot's New Desktop Search Toolbar," www.searchenginewatch.com, http://searchenginewatch.com/searchday/print.php/34711_339921, pp. 1-3, printed Apr. 14, 2004.
"Standardization Priorities for the Directory—Directory Interoperability Forum White Paper," The Open Group, Dec. 2001, pp. 1-21.
Sullivan, D., "Alta Vista Releases Search Software," *The Search Engine Report*, Aug. 4, 1998, pp. 1-2.
WebWatcher Home Page, "Welcome to the WebWatcher Project," http://www-2.cs.cmu.edu/~webwatcher/, printed Oct. 15, 2003.
"WhenU Just-In-Time Marketing," http://www.whenu.com, printed Mar. 19, 2004.
X1 instantly searches files & email. For outlook. Outlook, http://www.x1.com/, printed Mar. 15, 2004.
Zellweger, P., et al., "Fluid Links for Informed and Incremental Link Transitions," Proceedings of Hypertext'98, Pittsburgh, PA, Jun. 20-24, 1998, pp. 50-57.
Salahour, A., et al., "Desktop Rearrangement Based on Incoming Calls", IBM Technical Disclosure Bulletin, Jan. 1994, pp. 657-658, vol. 37, No. 01.

(56) References Cited

OTHER PUBLICATIONS

Wynblatt, M., et al., "Web Page Caricatures: Multimedia Summaries for WWW Documents," Proc. IEEE Intl Conf. Multimedia Computing and Systems, Jun. 22-Jul. 1, 1998, pp. 194-199.

Dumais, S., et al., "Implicit Queries (IQ) for Contextualization," Microsoft Research SIGIR'04, Jul. 25-29, 2004, ACM, 1 Page.

Dumais, S., et al., "Stuff I've Seen: A System for Personal Information Retrieval and Re-Use," Microsoft Research, SIGIR'03, Jul. 28-Aug. 1, 2003, ACM, 9 Pages.

Miller, B., "Associate File Extension with Shell OPEN command and Application," Code Project, Google Search, Jun. 2, 2000, 2 pages, can be retrieved at <URL:http://www.codeproject.com/shell/cgfiletype.asp>.

Salahour, A., et al,, "Desktop Rearrangement Based on Incoming Calls", IBM Technical Disclosure Bulletin, Jan. 1994, pp. 657-658, vol. 37, No. 01.

Wynblatt, M., et al., "Web Page Caricatures: Multimedia Summaries for WWW Documents," Proc. IEEE Int'l Conf. Multimedia Computing and Systems, Jun. 22-Jul. 1, 1998, pp. 194-199.

Archive of "Froogle," www.froogle.google.com, 1 page, [online] [Archived by http://archive.com on Mar. 30, 2004; Retrieved on Oct. 20, 2006] Retrieved from the Internet<URL:http://web.archive.org/web/20040330045133/froogle.google.com>.

Archive of "Google News," www.news.google.com, 5 pages, [online] [Archived by http://archive.com on Mar. 25, 2004; Retrieved on Oct. 20, 2006] Retrieved from the Internet<URL:http://web.archive.org/web/20040325173400/http://www.news.google.com>.

* cited by examiner

SYSTEMS AND METHODS FOR ARTICLE LOCATION AND RETRIEVAL

FIELD OF THE INVENTION

The present invention relates generally to methods and systems for information retrieval. The present invention relates particularly to systems and methods for article location and retrieval.

BACKGROUND

When a computer user attempts to locate or access a document in a conventional application, the user may issue a file-open command. The file-open command causes a dialog to be displayed in which the user can enter a file name or a path into a text box, which the application uses to locate the document. The text-box entry is typically limited to a short text string, which must match a file name or path exactly, either in whole or in part. For example, if the user enters "*budget*" (in this example, the asterisk represents a wildcard) in the text-entry box, the file name or path must include the term "budget" somewhere in the file name or path. A file or path including the term "financial" or the term "accounting" would not be found although a file that contained those terms may be relevant to what the user is seeking. The user may also have access to a find dialog, allowing the user to search on additional attributes of a file, such as the text in the file.

Some conventional document management systems provide additional flexibility. For example, Hummingbird's DOCS Open® (Hummingbird Ltd.; Toronto, Ontario, Canada; www.hummingbird.com) can be integrated into a user's desktop applications. When the user attempts to open or save a file, a DOCS Open® interface is displayed. The user is able to enter text into any one of a number of attributes for a document in order to search for the document.

SUMMARY

Embodiments of the present invention provide systems and methods for article location and retrieval. In one embodiment of the present invention, a computer program, such as a program for processing display output, interrupts the normal processing of an operating system call associated with a dialog control and causes a search dialog control to be displayed. The search dialog control may be associated with an index comprising a plurality of events that are associated with at least one client application. At least some of the events are captured in real time. Each event may be associated with one or more articles. In another embodiment, a computer-readable storage medium (such as, for example random access memory or a computer disk) comprises code for carrying out such a method.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE FIGURES

These and other features, aspects, and advantages of the present invention are better understood when the following Detailed Description is read with reference to the accompanying drawings, wherein.

DETAILED DESCRIPTION

Embodiments of the present invention provide systems and methods for article location and retrieval. Exemplary embodiments are described below.

System Architecture

Figure 1:
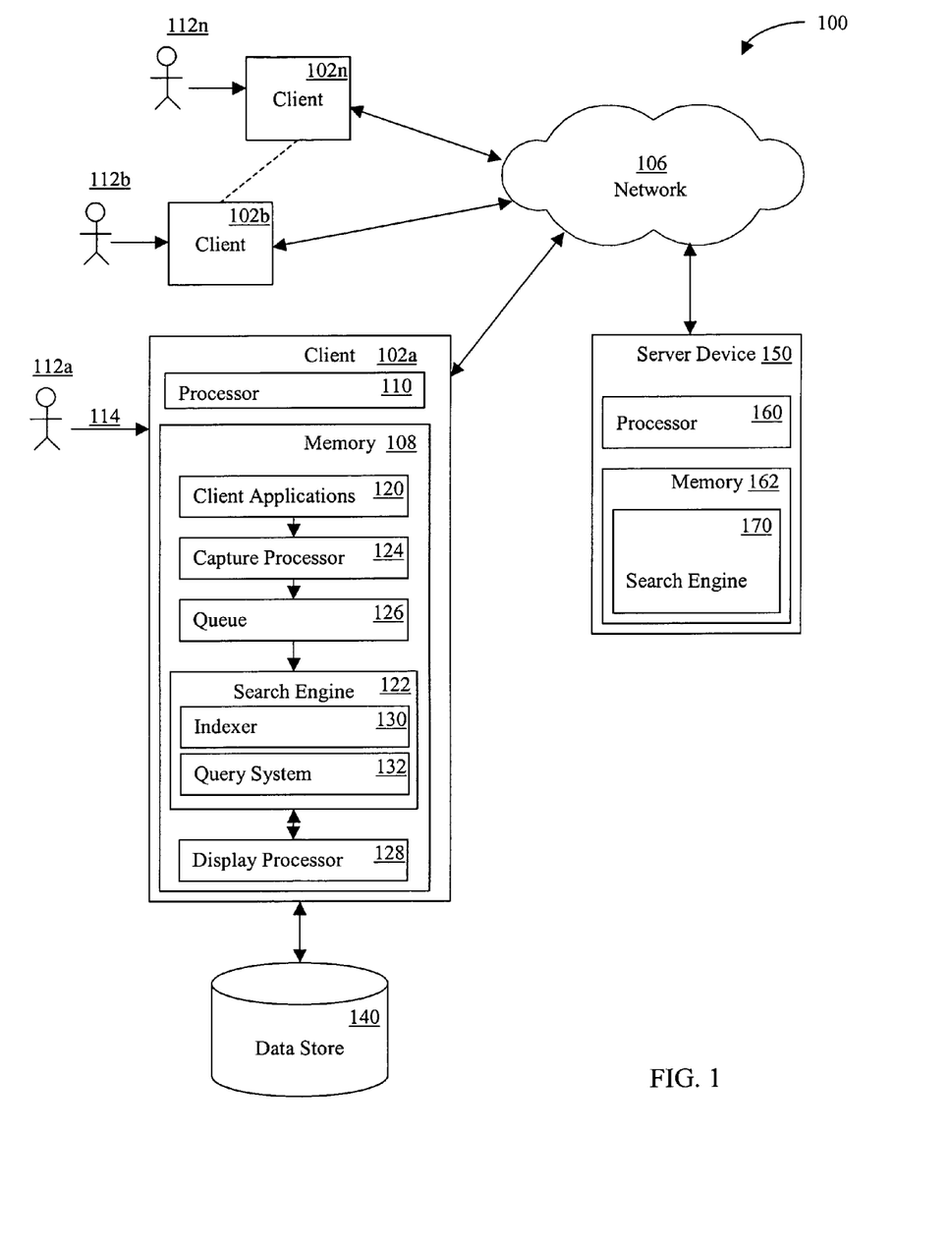
FIG. 1 is a block diagram illustrating an exemplary environment in which one embodiment of the present invention may operate.

Referring now to the drawings in which like numerals indicate like elements throughout the several figures, FIG. 1 is a block diagram illustrating an exemplary environment for implementation of an embodiment of the present invention. While the environment shown reflects a client-side search engine architecture embodiment, other embodiments are possible.

The system 100 shown in FIG. 1 includes multiple client devices 102a-n in communication with a server device 150 over a wired or wireless network 106. The network 106 shown comprises the Internet. In other embodiments, other networks, such as an intranet, may be used instead. Moreover, methods according to the present invention may operate within a single client device.

The client devices 102a-n shown each includes a computer-readable medium 108. The embodiment shown includes a random access memory (RAM) 108 coupled to a processor 110. The processor 110 executes computer-executable program instructions stored in memory 108. Such processors may include a microprocessor, an ASIC, a state machine, or other processor, and can be any of a number of computer processors, such as processors from Intel Corporation of Santa Clara, Calif. and Motorola Corporation of Schaumburg, Ill. Such processors include, or may be in communication with, media, for example computer-readable media, which stores instructions that, when executed by the processor, cause the processor to perform the steps described herein.

Embodiments of computer-readable storage media include, but are not limited to, an electronic, optical, magnetic, or other storage devices capable of providing a processor, such as the processor 110 of client 102a, with computer-readable instructions. Other examples of suitable storage media include, but are not limited to, a floppy disk, CD-ROM, DVD, magnetic disk, memory chip, ROM, RAM, an ASIC, a configured processor, all optical media, all magnetic tape or other magnetic media, or any other storage medium from which a computer processor can read instructions. The instructions may comprise code from any suitable computer-programming language, including, for example, C, C++, C#, Visual Basic, Java, Python, Perl, and JavaScript.

Client devices 102a-n can be connected to a network 106 as shown, or can be stand-alone machines. Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, the client devices 102a-n may be any type of processor-based platform that operates on any operating system, such as Microsoft® Windows® or Linux, capable of supporting one or more client application programs. For example, the client device 102a shown comprises a personal computer executing client application programs, also known as client applications 120. The client applications 120 can be contained in memory 108 and can include, for example, a word processing application, a spreadsheet application, an e-mail application, an instant messenger application, a presentation application, an Internet browser application, a calendar/organizer application, and any other application or computer program capable of being executed by a client device. Client applications may also include client-side applications that interacts with or accesses other applications (such as, for example, a web-browser executing on the client device 102a that interacts with a remote e-mail server to access e-mail).

The user 112a can interact with the various client applications 120 and articles associated with the client applications 120 via various input and output devices of the client device 102a. Articles include, for example, word processor, spreadsheet, presentation, e-mail, instant messenger, database, and other client application program content files or groups of files, web pages of various formats, such as HTML, XML, XHTML, Portable Document Format (PDF) files, and audio files, video files, or any other documents or groups of documents or information of any type whatsoever.

The memory 108 of the client device 102a shown also contains a capture processor 124, a queue 126, and a search engine 122. The client device 102a shown also contains or is in communication with a data store 140. The search engine 122 can receive an explicit query from the user 112a or generate an implicit query and retrieve information from the data store 140 in response to the query.

The data store 140 in the embodiment shown in FIG. 1 comprises a local index. The local index may comprise information, such as articles, which are associated with the client device 102a, a user 112a of the client device 102a, or a group of users of the client device 102a. For example, the local index in the data store 140 shown in FIG. 1 may comprise an index of articles created, edited, received, or stored by the client user 112a using the client machine 102a, or articles otherwise associated with the client user 102a or the client machine 112a. The local index may be stored in a client machine, such as in data store 140, in a data store on a local network in a manner accessible by the client machine, on a server accessible to the client machine through the Internet, or in another accessible location.

In contrast, a global index may comprise information relevant to many users or many servers, such as, for example, an index of web pages located on multiple servers in communication with the World Wide Web. One example of a global index is an index used by the Google™ search engine to provide search results in response to a search query.

A single index may comprise both a local and a global index. For example, in one embodiment, an index may comprise both local and global information, and include a user or client identifier with the local information so that it may be identified with the user(s) or client(s) to which it pertains. Moreover, an index, local or global, may be present in one or multiple logical or physical locations.

The search engine 122 shown contains an indexer 130, a query system 132, and a formatter 134. Events, real-time and historical, contextual and indexable, and performance data can be sent by the queue 126 to the query system 132 to provide the query system 132 with information concerning current user context. The query system 132 can use this information to generate an implicit query. The query system 132 can also receive and process explicit queries from the user 112a.

The data store 140 can be any type of computer-readable media and can be integrated with the client device 102a, such as a hard drive, or external to the client device 102a, such as an external hard drive or on another data storage device accessed through the network 106. The data store 140 may include any one or combination of methods for storing data, including without limitation, arrays, hash tables, lists, and pairs.

In the embodiment shown in FIG. 1, a user 112a can input an explicit query into a search engine interface displayed on the client device 102a, which is received by the search engine 122. The search engine 122 can also generate an implicit query based on a current user context or state, which can be determined by the query system 132 from contextual real time events or other means. Based on the query, the query system 132 can locate relevant information in the data store 140 or other index and provide a result set. In one embodiment, the result set comprises article identifiers identifying articles associated with the client applications 120 or client articles. Client articles stored in the data store 140 include articles associated with the user 112a or client device 102a, such as the word processing documents, previously viewed web pages and any other article associated with the client device 102a or user 112a. In another embodiment, the result set also comprises identifiers identifying articles located on the network 106 or network articles located by a search engine on a server device. Network articles include articles located on the network 106 not previously viewed or otherwise referenced by the user 112a, such as web pages not previously viewed by the user 112a.

The result sets comprise one or more article identifiers. An article identifier may be, for example, a Uniform Resource Locator (URL), a file name, a link, an icon, a path for a local file, or anything else that identifies an article. In the embodiment shown, an article identifier comprises a URL associated with an article.

Messaging articles stored in the data store 140 include user's emails, chat messages, and instant messaging messages. Each time a message is received, sent, modified, printed, or otherwise accessed, a record is stored in the data store 140. This information can later be searched to identify messages that should be displayed in the user interface.

An embodiment of the present invention may also store message threads in the data store 140. In such an embodiment, messages are related together by various attributes, including, for example, the sender, recipient, date/time sent and received, the subject, the content, or any other attribute of the message. The related messages can then be retrieved as a thread, which may be treated as a document by the display processor 128.

The formatter 134 can receive the search result set from the query system 132 of the search engine 122 and can format the results for output to a display processor 128. In one embodiment, the formatter 134 formats the results in XML or HTML. The display processor 128 can be contained in memory 108 and can control the display of the result set on a display device associated with the client device 102a. The display processor 128 may comprise various components. For example, in one embodiment, the display processor 128 comprises a Hypertext Transfer Protocol (HTTP) server that receives requests for information and responds by constructing and transmitting Hypertext Markup Language (HTML) pages. In one such embodiment, the HTTP server comprises a scaled-down version of the Apache Web server. In various embodiments, the functions described herein may be performed by various other components and devices.

Through the client devices 102a-n, users 112a-n can communicate over the network 106, with each other and with other systems and devices coupled to the network 106. As shown in FIG. 1, a server device 150 is also coupled to the network 106. In the embodiment shown, the search engine 122 can transmit a search query comprised of an explicit or implicit query or both to the server device 150. The user 112a can also enter a search query in a search engine interface, which can be transmitted to the server device 150. In another embodiment, the query signal may instead be sent to a proxy server (not shown), which then transmits the query signal to server device 150. Other configurations are also possible.

The server device 150 shown includes a server executing a search engine application program, such as the Google™ search engine. Similar to the client devices 102a-n, the server device 150 shown includes a processor 160 coupled to a computer-readable memory 162. Server device 150, depicted as a single computer system, may be implemented as a network of computer processors. Examples of a server device 150 are servers, mainframe computers, networked computers, a processor-based device, and similar types of systems and devices. The server processor 160 can be any of a number of or combination of computer processors, such as processors from Intel Corporation of Santa Clara, Calif. and Motorola Corporation of Schaumburg, Ill.

Memory 162 contains the search engine application program, also known as a search engine 170. The search engine 170 locates relevant information in response to a search query from a client device 102a. The search engine 122 then provides the result set to the client device 102a via the network 106. The result set 134 comprises one or more article identifiers. An article identifier may be, for example, a URL, a file name, a link, an icon, a path for a local file, or anything else that identifies an article. In the embodiment shown, an article identifier comprises a URL associated with an article. The result set may include text, audio, video or any other type of content.

In the embodiment shown, the server device 150, or related device, has previously performed a crawl of the network 106 to locate articles, such as web pages, stored at other devices or systems connected to the network 106, and indexed the articles in memory 162 or on another data storage device. In other embodiments, a crawl is not performed. For example, in one embodiment, an index of articles is created manually.

It should be noted that embodiments of the present invention may comprise systems having different architecture than that which is shown in FIG. 1. For example, in some systems according to the present invention, server device 104 may comprise a single physical or logical server. The system 100 shown in FIG. 1 is merely exemplary, and is used to explain the exemplary method shown in FIG. 2.

Process

Various methods may be implemented in the environment shown in FIG. 1 and other environments, according to the present invention. Methods according to the present invention may be implemented by, for example, a processor-executable program code stored on a computer-readable medium.

In one embodiment of the present invention, a computer program, such as a display processor 128, causes a search dialog control to be displayed. For example, in one embodiment, the computer program may cause an interruption of the normal processing of an operating system call associated with a dialog control and cause the search dialog control to be displayed. The search dialog control may be associated with an index comprising a plurality of events. Each of the plurality of events is associated with at least one of a plurality of client applications, and at least some of the plurality of events are captured in real time. Each event may be associated with an article.

For example, in one embodiment, a word-processing program or other application program transmits an operating system call to open a common "File/Open" dialog control. The display processor 128 interrupts the normal processing of the call, i.e., prevents the common dialog from being displayed, and instead, displays a custom dialog control. In another embodiment, the display processor 128 displays a modified version of the common dialog, preserving existing functionality while adding additional features. The operating system call may identify the type of application program so that application-specific functionality can be invoked. In an alternative embodiment, the original dialog control is displayed as normal, and an additional dialog control is displayed. This additional control may appear next to the original dialog control, or may appear within appear within an existing content display, for example.

Interrupting the system call may be performed in various ways in embodiments of the present invention. For example, in a Microsoft® Windows® operating system, interrupting the system call may be accomplished via hooking or via standard API calls.

The dialog control that the display processor 128 displays may comprise a common dialog control or a custom dialog control. The dialog control may comprise a modified version of a common dialog control. For example, the dialog control may appear substantially the same as the "File/Open" dialog but function differently or include only somewhat different controls, such as an additional button.

In other embodiments, the dialog may be substantially similar to other common dialog controls, such as the find dialog control. Alternatively, the dialog control may comprise an additional button that is specific to the functionality described herein, such as a custom "Browse" button.

In one embodiment, the dialog control comprises a text box. The user enters a search term in the text box and indicates that the search should begin by, for example, clicking an "Open" or "Search" button or by way of some other mechanism for issuing a search request. The display processor receives the input and causes a search to be performed on the index.

Figure 2:
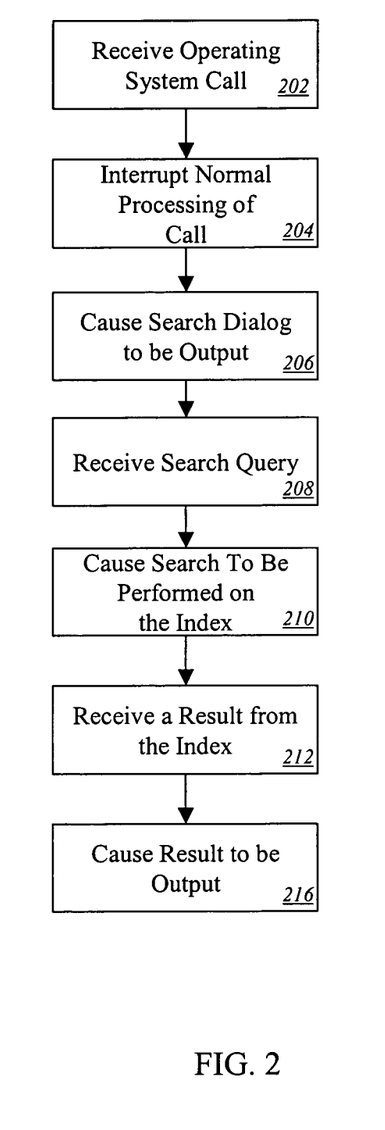
FIG. 2 is a flowchart illustrating a process for intercepting an operating system call in one embodiment of the present invention.

FIG. 2 is a flowchart illustrating a process for intercepting an operating system call in one embodiment of the present invention. In the embodiment shown in FIG. 2, a client application 128 makes a call to the operating system on the client 102a to display the file open common dialog. A program executing on the client 102a, such as the display processor 128, receives the operating system call 202.

The display processor 128 then interrupts the normal processing of the operating system call 204. Intercepting an operating system call and providing an application-specific function is known in the art of applications development. Such functionality is sometimes referred to as spying or hooking. For example, an application executing in a Microsoft® Windows® environment can utilize the SetWindowsHookEx function to install a hook procedure at the beginning of a hook chain. Microsoft® Windows® supports a number of chains, including, for example, the WH_CALLWNDPROC and WH_CALLWNDPROCRET hook chains. The operating system calls the WH_CALLWNDPROC before passing a message to a receiving window procedure and calls the WH_CALLWNDPROCRET after the window procedure has processed the message. An application can utilize these hooks to intercept any calls between windows executing within the operating system. Once the calls are intercepted, application specific functions can be inserted in the processing chain in addition to or instead of the standard or default functions. From the foregoing description, it will be appreciated by those skilled in the art that embodiments of the present invention may, with some modification, similarly be implemented in conjunction with other (e.g., non-Windows) operating systems.

In the embodiment of the present invention shown in FIG. 2, the display processor 128 then causes a custom search dialog to be displayed 206. One such dialog is shown in, and described below in relation to, FIG. 3. The search dialog may comprise a textbox in which a computer user enters a search query. Other types of dialogs may also be used. For example, in one embodiment, a list of articles is displayed to the user. In another embodiment, the dialog may take the form of, for example, another button or an extra field.

The articles displayed in a content display of such an embodiment are articles that the user has recently viewed, edited, printed, or otherwise interacted with. In another embodiment, the custom dialog control allows configuration of indexing options. For example, upon interception of a "File Save" dialog box, or a file write operating system event, the custom dialog control can display indexing options, allowing the user to select whether or not they would like the saved file to be indexed. Additional options may include an indexing level, such as whether the full content with images should be indexed, or whether only the text should be indexed. In one embodiment, this dialog is displayed each time and defaults to the user's last selection for the file type. In another embodiment, the custom dialog control is only displayed the first time a particular file type is encountered, and the user's option is automatically used in the future. In one embodiment, the user is not required to select an indexing option at that time. For example, the system may display the custom dialog within a section of a content display, which maintains a list of pending indexing options. The user may respond to these options when he or she prefers. In one embodiment, the options are only displayed on the screen for a short period, but an option in the user interface allows the user to display and respond to these options.

In one embodiment, an indexing preferences control is displayed to the user. In such an embodiment, the indexer utilizes these preferences when indexing files and/or events. The indexing preferences control allows the user to specify preferences, such as, for example, whether the system stores and/or indexes files and/or events of a particular type. For example, in one embodiment, the user specifies that the indexer index files which are of the same type as the file the user is editing.

Other preferences may also be specified. In one embodiment, the user specifies whether or not to store native and/or processed content in the data store 140. In another embodiment, the user specifies how much storage space each file or event may occupy (e.g., only store the first 50 KB of a file or index).

The user may not wish to alter preferences each time an event occurs that might trigger display of the dialog control. In one embodiment, the user is presented with the dialog control only on the first occurrence of a file and/or event type (e.g., only the first time a Word document is opened or saved). In another embodiment, the control is presented to the user each time, but the setting in the dialog are set to the last known settings for the particular user/file/event combination.

Referring still to FIG. 2, the user enters a search query in the custom dialog and presses a button. The display processor 128 receives the search query 208 and causes the search to be executed on an index associated with the custom dialog 210. In other words, code associated with the press of the button causes a search to be executed on a particular index or on particular indices. The index may be stored locally, e.g., in the data store 140, or may be a global index. The index comprises one or more events. An event may include, for example, information indicating that the user printed a particular word-processing document within the previous hour. The event is associated with a client application, e.g., the word-processing application. At least some of the events are captured in real time. For example, in the case of the user printing a document, a program, such as the capture processor 124 in the embodiment shown in FIG. 1, captures the event and stores it in the index. The event can be subsequently accessed.

A query system or search engine, such as query system 132, executes the query on the index and returns a result. The display processor receives the result 212. The result may comprise zero, one, or many articles or article identifiers. The result may comprise a formatted page, e.g., an HTML page, or may comprise a data set. The display processor 128 causes the result to be output 216. The output may comprise a list, an HTML page, audio output, or any other type of suitable output of the results.

Example

In one embodiment of the present invention, a user wishes to access a document that the user printed within the last two months. The document included information about the Segway™ Human Transporter (HT). The user is not sure whether the document was an attachment to an email, an article the user found on the Internet, or an article the user accessed in some other way.

Figure 3:
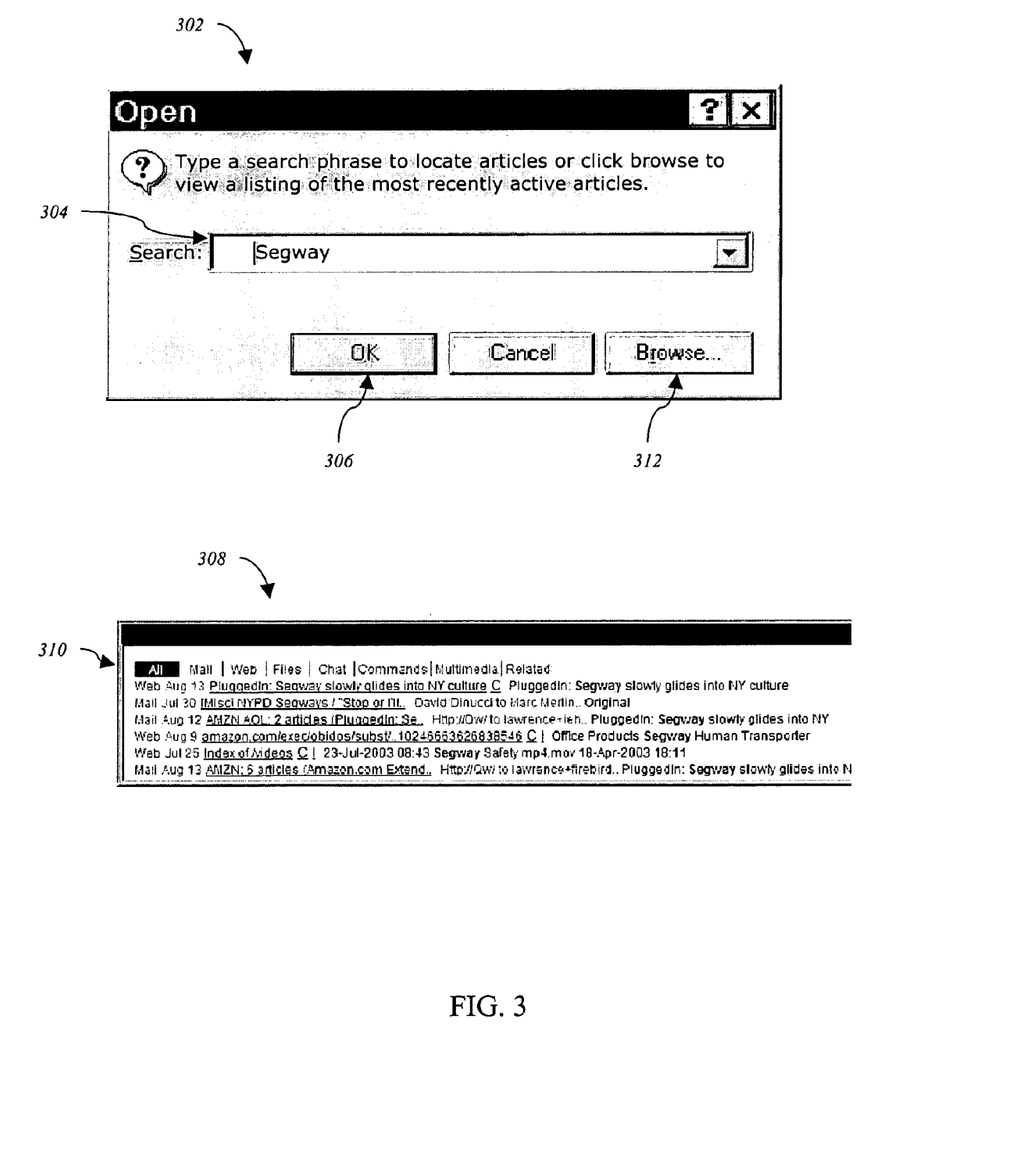
FIG. 3 is a screen shot illustrating a user interface including a search dialog in one embodiment of the present invention.

To find the document, the user accesses a word-processing application. The user clicks the "File/Open" button to open the document. The dialog shown in FIG. 3 is displayed. FIG. 3 is a screen shot illustrating a user interface including a search dialog in one embodiment of the present invention. The dialog 302 shown in FIG. 3 comprises a text box for entering a search term 304. The user enters the search term, in this case "Segway," in the text box 304 and clicks the "OK" button 306.

When the user clicks the "OK" button 306, the display processor 128 causes the search to be executed on a local or global index as defined herein. The index provides the display processor 128 with results; the display processor 128 generates a content display, such as content display 308. The display processor 128 causes the content display 308 to be output to the user. The content display comprises a list of articles 310 related to the user's search term, "Segway." The list of articles in the embodiment shown in FIG. 3 includes one or a combination of articles with which a user may interact, including, for example, without limitation email, web, files, chat messages, and other types of articles. In other embodiments, the content display 308 may be structured in other ways, such as a drop-down combo or list box or other type of control or display.

In one embodiment, the results searched and/or returned to the user are restricted based on the context of what is being modified. For instance, in one such embodiment, when the user is editing a documents in Microsoft® Word, only Word documents may be searched.

In the embodiment shown, if the user is not sure of what term to use to find content, the user can simply click the Browse button 312 of the dialog 302. Upon pressing the "Browse" button, the user is presented with a version of the content display 308 that includes articles which were recently accessed, created, or fit some other criteria that identifies them as potentially of interest to the user.

General

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention.

That which is claimed:

1. A method comprising:
   interrupting normal processing of an operating system call associated with a first dialog control specific to an application;
   outputting an indexing preferences dialog control to a display responsive to the interruption, wherein the indexing preferences dialog control comprises a type of dialog different than the first dialog control, the indexing preferences dialog control adapted to receive from a user a selection of indexing preferences specific to a file type associated with the application; and
   indexing a plurality of events based at least in part on the indexing preferences received from the user, wherein each of the plurality of events is associated with an article and comprises event data describing a user interaction with the article using a client application, wherein at least some of the plurality of events are indexed and stored in real time upon the occurrences of the events.

2. The method of claim 1, further comprising displaying the indexing preference dialog control only on a first occurrence of a particular type of operating system call.

3. The method of claim 1, wherein the first dialog control is a search dialog control adapted to receive a search query from the user.

4. The method of claim 1, wherein the first dialog control is a file open dialog control adapted to allow the user to open articles of the file type associated with the application.

5. The method of claim 1, wherein the first dialog control is a file save dialog control adapted to allow the user to save articles of the file type associated with the application.

6. The method of claim 1, wherein the first dialog control is a find dialog control adapted to allow the user to find content.

7. The method of claim 1, wherein interrupting normal processing of the operating system call comprises hooking into an operating system's application programming interface (API).

8. The method of claim 1, wherein the operating system call is associated with the application.

9. The method of claim 1, wherein the indexing preferences include an indication of content within an article to index.

10. The method of claim 1, wherein the indexing preferences include an indication to index events associated with articles of the file type.

11. The method of claim 1, wherein the indexing preferences include an indication as to a maximum storage space an indexed event may occupy.

12. A non-transitory computer-readable storage medium having computer-executable instructions, the instructions when executed causing the performance of steps comprising:
   interrupting normal processing of an operating system call associated with a first dialog control specific to an application;
   outputting an indexing preferences dialog control to a display responsive to the interruption, wherein the indexing preferences dialog control comprises a type of dialog different than the first dialog control, the indexing preferences dialog control adapted to receive from a user a selection of indexing preferences specific to a file type associated with the application; and
   indexing a plurality of events based at least in part on the indexing preferences received from the user, wherein each of the plurality of events is associated with an article and comprises event data describing a user interaction with the article using a client application, wherein at least some of the plurality of events are indexed and stored in real time upon the occurrences of the events.

13. The computer-readable storage medium of claim 12, further comprising displaying the indexing preference dialog control on only a first occurrence of a particular type of operating system call.

14. The computer-readable storage medium of claim 12, wherein the indexing preferences include an indication of content within an article to index.

15. The computer-readable storage medium of claim 12, wherein the indexing preferences include an indication to index events associated with articles of the file type.

16. The computer-readable storage medium of claim 12, wherein the indexing preferences include an indication as to a maximum storage space an indexed event may occupy.

17. A computer system comprising:
   a computer processor; and
   a non-transitory computer-readable storage medium storing computer instructions executed by the computer processor and causing the computer processor to perform steps comprising:
      interrupting normal processing of an operating system call associated with a first dialog control specific to an application;
      outputting an indexing preferences dialog control to a display responsive to the interruption, wherein the indexing preferences dialog control comprises a type of dialog different than the first dialog control, the indexing preferences dialog control adapted to receive from a user a selection of indexing preferences specific to a file type associated with the application; and
      indexing a plurality of events based at least in part on the indexing preferences received from the user, wherein each of the plurality of events is associated with an article and comprises event data describing a user interaction with the article using a client application, wherein at least some of the plurality of events are indexed and stored in real time upon the occurrences of the events.

18. The system of claim 17, wherein the indexing preferences include an indication of content within an article to index.

19. The system of claim 17, wherein the indexing preferences include an indication to index events associated with articles of the file type.

20. The system of claim 17, wherein the indexing preferences include an indication as to a maximum storage space an indexed event may occupy.

* * * * *